(12) United States Patent
Hatada

(10) Patent No.: US 7,944,625 B2
(45) Date of Patent: May 17, 2011

(54) OPTICAL SYSTEM AND IMAGE PICKUP APPARATUS HAVING THE SAME

(75) Inventor: Takahiro Hatada, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 73 days.

(21) Appl. No.: 12/536,307

(22) Filed: Aug. 5, 2009

(65) Prior Publication Data

US 2010/0033848 A1     Feb. 11, 2010

(30) Foreign Application Priority Data

Aug. 7, 2008     (JP) .................. 2008-204028

(51) Int. Cl.
G02B 13/04     (2006.01)
(52) U.S. Cl. ...................... 359/749; 359/753

(58) Field of Classification Search ........... 359/749–753
See application file for complete search history.

(56) References Cited

U.S. PATENT DOCUMENTS

| 5,315,441 A | 5/1994 | Hori |
| 5,559,638 A | 9/1996 | Aoki |
| 2003/0156335 A1* | 8/2003 | Takatsuki .................. 359/753 |

* cited by examiner

*Primary Examiner* — Scott J Sugarman
(74) *Attorney, Agent, or Firm* — Canon U.S.A., Inc., IP Division

(57) ABSTRACT

An optical system includes a first lens unit, an aperture stop, and a second lens unit having a positive refractive power. In the optical system, the first lens unit includes at least one positive lens made of a material whose Abbe number (vdGP) and relative partial dispersion (θgFGP) satisfy a predetermined condition.

8 Claims, 5 Drawing Sheets

OPTICAL SYSTEM AND IMAGE PICKUP APPARATUS HAVING THE SAME

BACKGROUND OF THE INVENTION

1. Field of the Invention

The present invention relates to an optical system. More specifically, the present invention relates to a photographic optical system of an image pickup apparatus.

2. Description of the Related Art

It is desired by the market that a photographic optical system of a single-lens reflex digital camera or a single-lens reflex film camera has a wide angle of view and a long back focal length. U.S. Pat. No. 5,559,638 discusses a retrofocus photographic optical system as a photographic optical system having a wide angle of view and a long back focal length.

In such a retrofocus photographic optical system, a lens unit having an overall negative refractive power is disposed on the front portion of the photographic optical system (on the object side in a photographic optical system of a camera). Furthermore, a lens unit having an overall positive refractive power is disposed on the rear portion of the photographic optical system (on the image side in a photographic optical system of a camera).

An optical system having a wide angle of view and a long back focal length can be implemented by a configuration described above, in which the overall refractive power is asymmetrically arranged. The degree of asymmetry of the refractive power may become higher as the angle of view becomes wider. If the degree of asymmetry of the refractive power becomes high, various aberrations, such as coma, astigmatism, and spherical aberration, are likely to occur in a large amount.

For example, in a retrofocus photographic optical system whose F-number is about 1.4, the amount of various aberrations that may occur in a rear lens unit having a positive refractive power, which is disposed closer to the back side of the optical system than a front lens unit having a negative refractive power and an aperture stop, may be greater than that occurring in the front lens unit having a negative refractive power.

Therefore, it is difficult to effectively and balancedly correct various aberrations occurring in a retrofocus photographic optical system. In addition, in a retrofocus photographic optical system whose F-number is about 1.4, the effective diameter of the optical system may be likely to become large. Particularly, if the distance between the aperture stop and the rear lens unit becomes long, the effective diameter of the rear lens may increase. In this case, it becomes difficult to mount the lens barrel including the photographic optical system on the camera.

In order to solve the above-described matter, it may be useful if the positive lens constituting the rear lens unit, which is disposed closer to the back side of the photographic optical system than the aperture stop, is made of a glass material having a high refractive index.

If the above-described configuration is employed, it becomes easy to effectively correct various aberrations with a small number of lenses. In addition, in this case, the distance between the aperture stop and the rear lens unit can be reduced. Accordingly, the effective diameter of the rear lens can be reduced.

However, if the rear positive lens, which is disposed closer to the back side of the photographic optical system than the aperture stop, is made of a glass material having a high refractive index, then axial chromatic aberration and chromatic aberration of magnification may increase. This is because generally, the degree of dispersion of a glass material having a high refractive index is high (i.e., the Abbe number of a glass material like this is small).

More specifically, this is because as the angle of view of a photographic optical system becomes wider, the amount of axial chromatic aberration (longitudinal chromatic aberration) and chromatic aberration of magnification (lateral chromatic aberration) may become greater.

For the above-described reasons, in a retrofocus photographic optical system, it is difficult to form a high-quality image on the entire image plane while implementing a wide angle of view and a long back focal length.

SUMMARY OF THE INVENTION

According to an aspect of the present invention, an optical system includes, a first lens unit, an aperture stop, and a second lens unit having a positive refractive power, wherein the first lens unit includes at least one positive lens made of a material whose Abbe number (vdGP) and relative partial dispersion (θgFGP) satisfy the following conditions:

$$\theta gFGP - (0.6438 - 0.001682 \times vdGP) > 0.005$$

$$60 < vdGP.$$

According to another aspect of the present invention, an optical system includes, in order from an object side to an image side, a first lens unit, an aperture stop, and a second lens unit having a positive refractive power, wherein the first lens unit includes at least one positive lens made of a material whose Abbe number (vdGP) and relative partial dispersion (θgFGP) satisfy the following conditions:

$$\theta gFGP - (0.6438 - 0.001682 \times vdGP) > 0.005$$

$$60 < vdGP, \text{ and}$$

wherein a back focal length when focusing on an infinitely-distant object point (BF), a focal length of the entire optical system (f), an average refractive index of materials of positive lenses included in the second lens unit (Np), and a distance from a surface of the positive lens of the first lens unit on the image side to the aperture stop on an optical axis (Lp) satisfy following conditions:

$$1.0 < BF/f < 3.0$$

$$1.6 < Np$$

$$0.01 < Lp/f < 0.80.$$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DETAILED DESCRIPTION OF THE EMBODIMENTS

Figure 1:
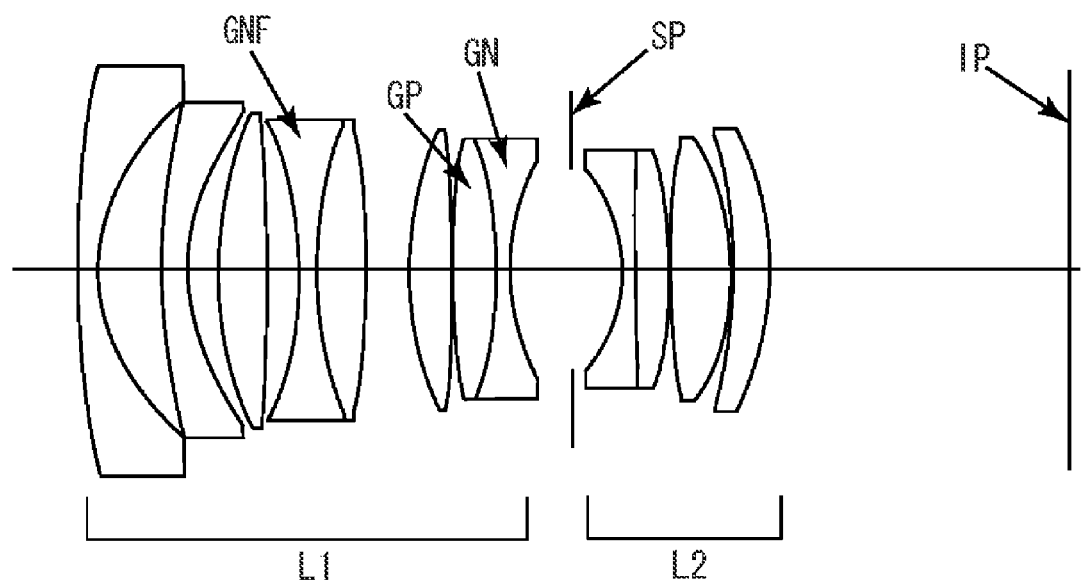
FIG. 1 is a lens cross section of an optical system according to a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

Now, an optical system and an image pickup apparatus having the optical system according to an exemplary embodiment of the present invention will be described below.

The optical system according to an exemplary embodiment of the present invention is a retrofocus the optical system. A "retrofocus optical system" refers to an optical system whose focal length is shorter than the entire dimension of the lens (the length from a first lens surface to an image plane).

The optical system according to an exemplary embodiment of the present invention includes a first lens unit, an aperture stop, a second lens unit having a positive refractive power, in order from an object side to an image side. The first lens unit includes a positive lens and a negative lens that are each made of a material whose Abbe number and relative partial dispersion have an appropriate value.

Figure 2:
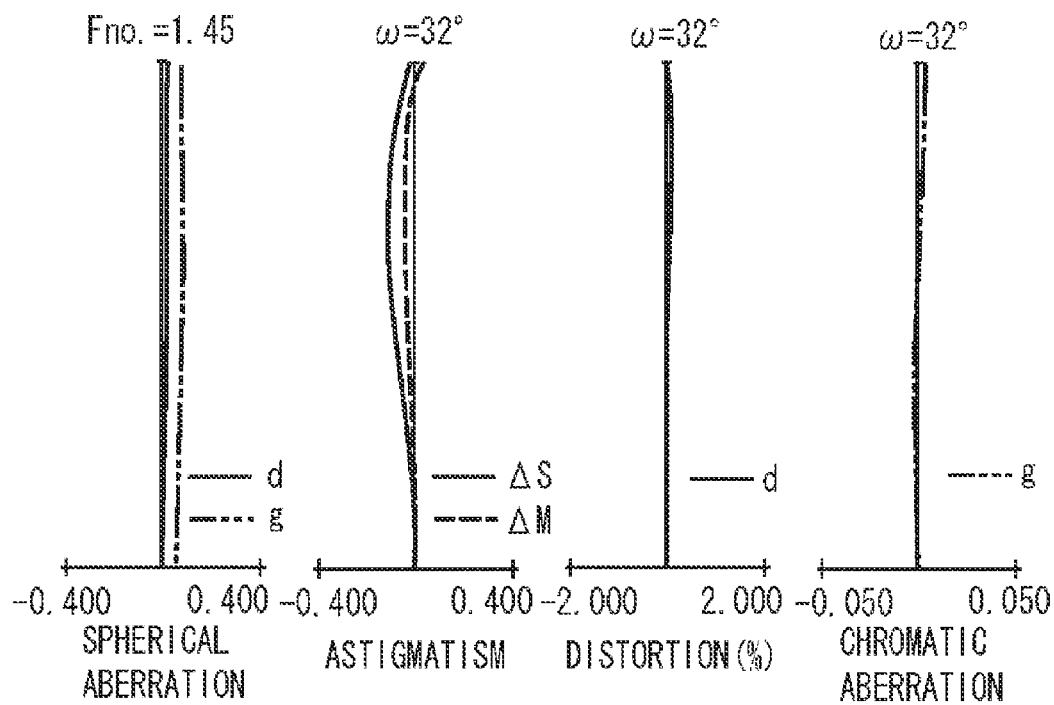
FIG. 2 is an aberration chart of an optical system when forming an image of an infinitely-distant object according to the first exemplary embodiment of the present invention.

FIG. 1 is a lens cross section of the optical system according to a first exemplary embodiment of the present invention. FIG. 2 is an aberration chart when the optical system focuses on an infinitely-distant object according to the first exemplary embodiment.

Figure 3:
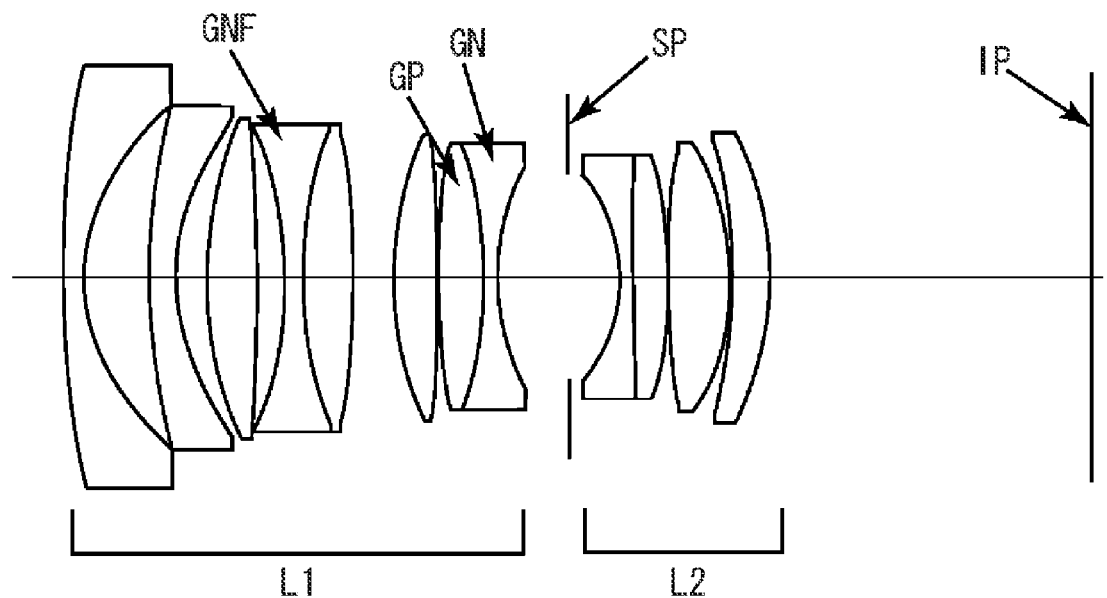
FIG. 3 is a lens cross section of an optical system according to a second exemplary embodiment of the present invention.
Figure 4:
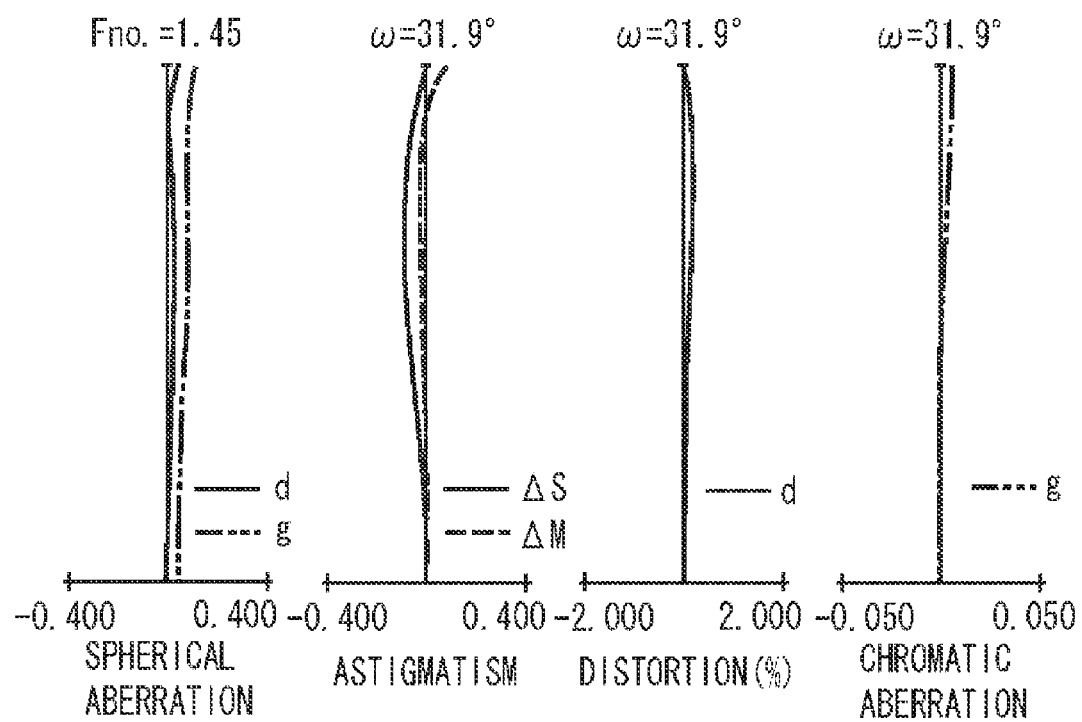
FIG. 4 is an aberration chart of an optical system when forming an image of an infinitely-distant object according to the second exemplary embodiment of the present invention.

FIG. 3 is a lens cross section of the optical system according to a second exemplary embodiment of the present invention. FIG. 4 is an aberration chart when the optical system focuses on an infinitely-distant object according to the second exemplary embodiment.

Figure 5:
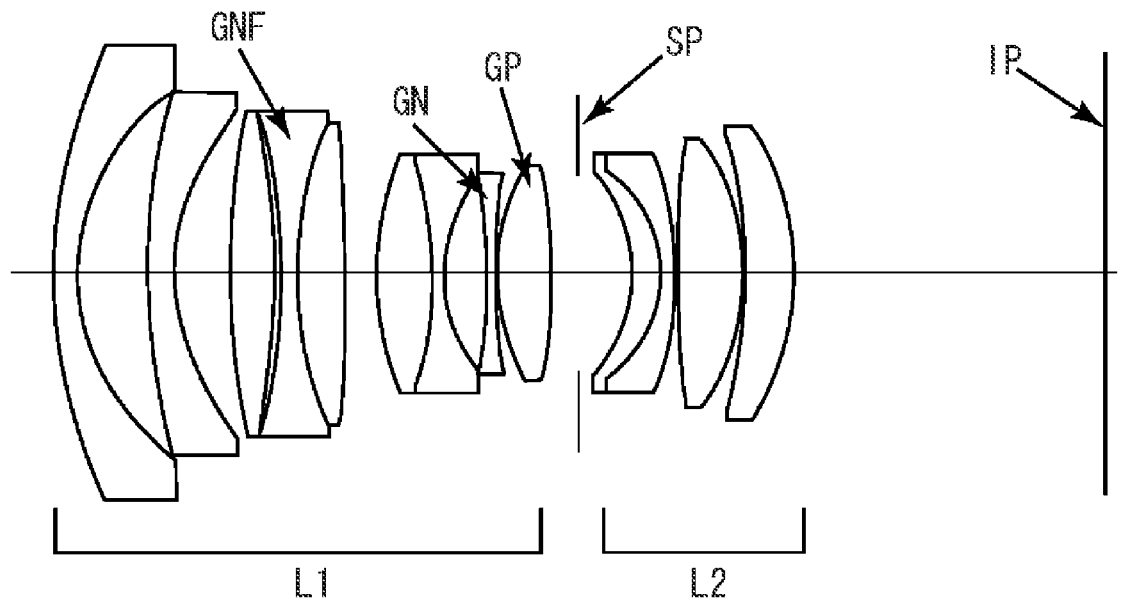
FIG. 5 is a lens cross section of an optical system according to a third exemplary embodiment of the present invention.
Figure 6:
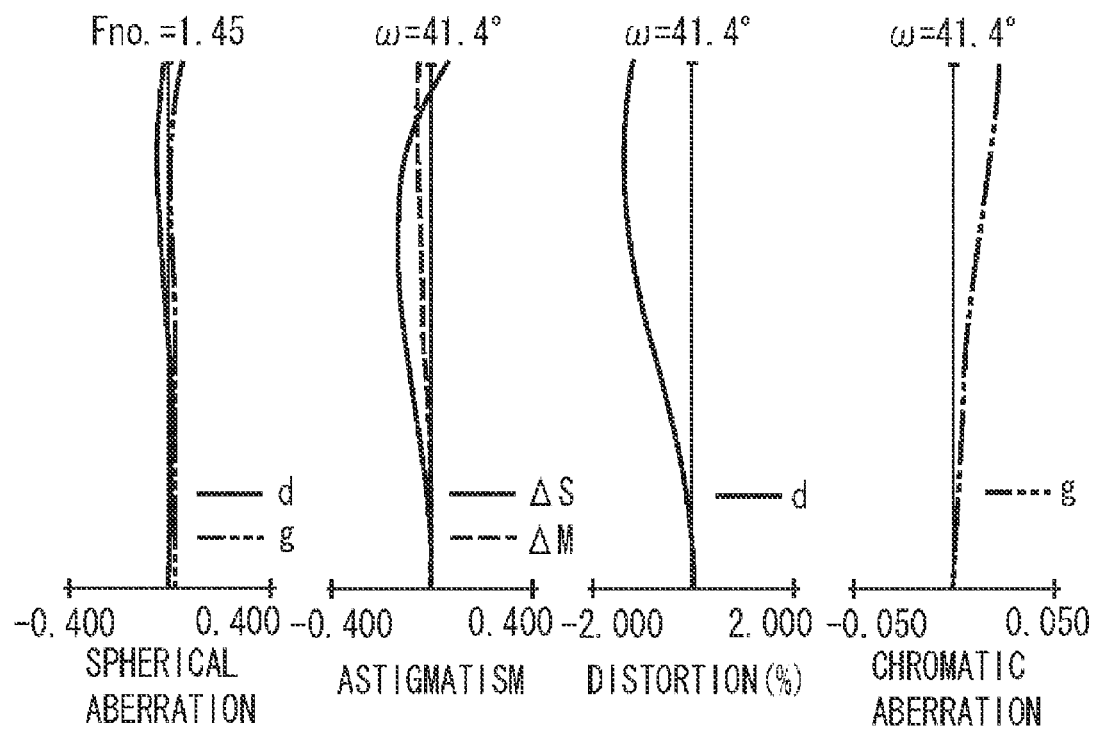
FIG. 6 is an aberration chart of an optical system when forming an image of an infinitely-distant object according to the third exemplary embodiment of the present invention.

FIG. 5 is a lens cross section of the optical system according to a third exemplary embodiment of the present invention. FIG. 6 is an aberration chart when the optical system focuses on an infinitely-distant object according to the third exemplary embodiment.

Figure 7:
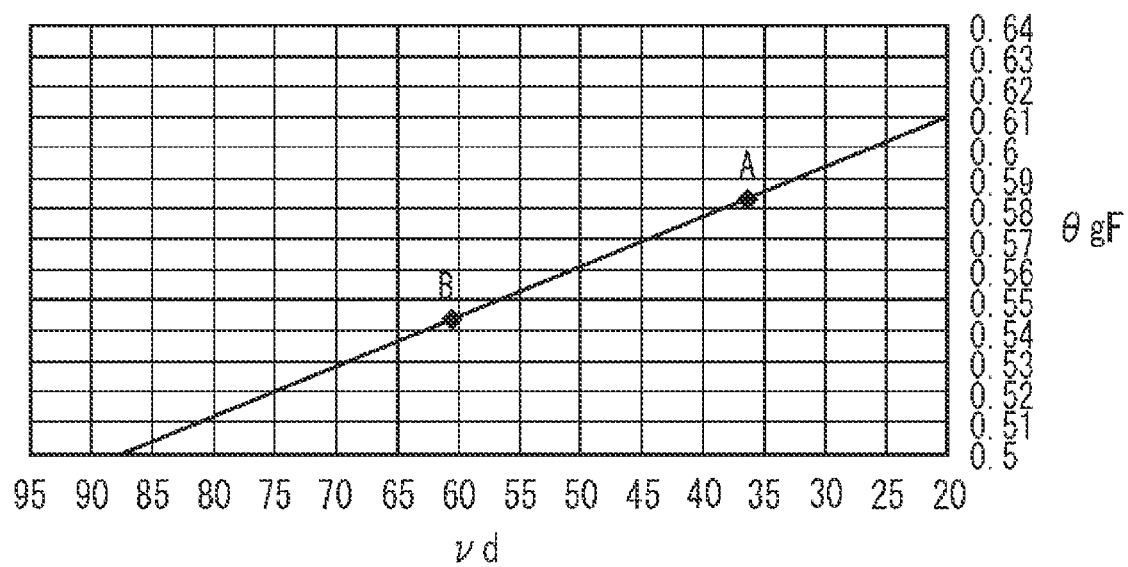
FIG. 7 illustrates a relationship between Abbe number vd and relative partial dispersion θ.
Figure 8:
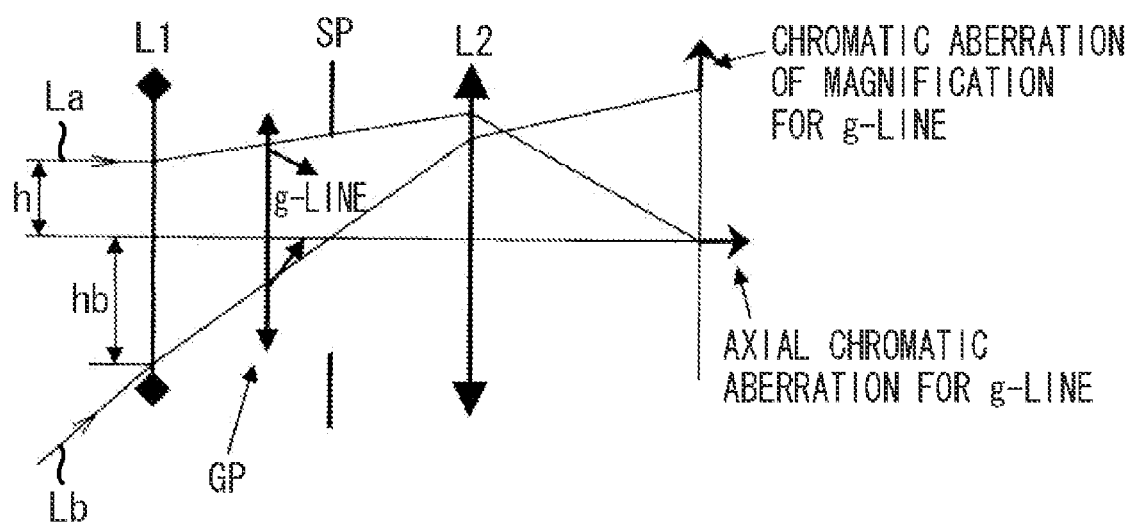
FIG. 8 illustrates the principle of correcting chromatic aberration in a retrofocus optical system.

FIG. 7 illustrates a relationship between Abbe number vd and relative partial dispersion θ. FIG. 8 illustrates the principle of correcting chromatic aberration in a retrofocus optical system.

Figure 9:
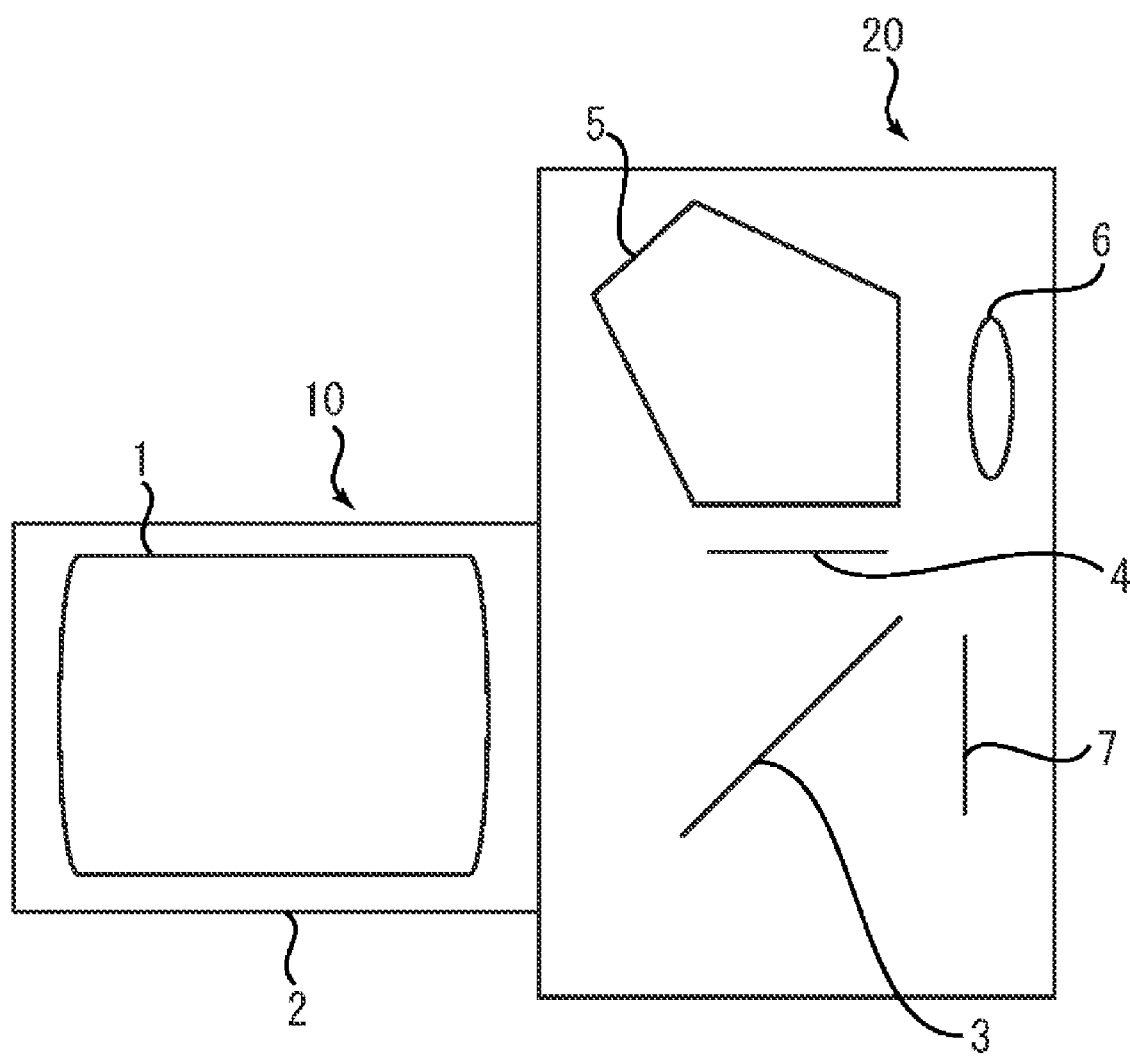
FIG. 9 illustrates exemplary main components of an image pickup apparatus according to an exemplary embodiment of the present invention.

FIG. 9 illustrates exemplary main components of a camera (image pickup apparatus) having an optical system according to an exemplary embodiment of the present invention.

The optical system of each exemplary embodiment is a photographic optical system used in an image pickup apparatus, such as a video camera, a digital camera, or a silver-halide film camera.

In each lens cross section, a left-hand portion of the figure indicates the object side (front side) and a right-hand portion of the figure indicates the image side (rear (back) side). If the optical system according to an exemplary embodiment of the present invention is used as a projection lens for a projector, in each of the diagrams showing a cross section of an optical system (FIGS. 1, 3, and 5), the side of a screen is indicated at the left-hand portion of the figure, and the side of an image to be projected is indicated at the right-hand portion thereof.

In each of the diagrams showing a cross section of an optical system (FIGS. 1, 3, and 5), "i" denotes the order of a lens unit from the object side and "Li" denotes an i-th lens unit. In addition, in each of the diagrams showing a cross section of an optical system (FIGS. 1, 3, and 5), the optical system according to each exemplary embodiment includes a first lens unit L1 having a positive or negative refractive power, a stop (aperture stop) SP, and a second lens unit L2 having a positive refractive power. The term "refractive power" refers to an optical power, which is an inverse of the focal length.

"IP" denotes an image plane. The image plane IP is, when the optical system according to an exemplary embodiment of the present invention is used as a photographic optical system of a video camera or a digital still camera, equivalent to an imaging plane of a solid-state image sensor (photoelectric conversion element) such as a charge-coupled device (CCD) sensor or a complementary metal-oxide semiconductor (CMOS) sensor. The image plane IP is, when the optical system is used as a photographic optical system of a silver-halide film camera, equivalent to a film surface.

In each of the aberration charts (FIGS. 2, 4, and 6), "d" and "g" respectively denote d-line and g-line light. "ΔM" and "ΔS" respectively denote a meridional image plane and a sagittal image plane. Chromatic aberration of magnification is represented with g-line light.

"Fno" denotes an F-number, and "ω" denotes a half angle of view.

In the optical system according to an exemplary embodiment of the present invention, the first lens unit L1 includes at least one positive lens GP made of a material whose Abbe number (vdGP) and relative partial dispersion (θgFGP) satisfy the following conditions:

$$\theta gFGP - (0.6438 - 0.001682 \times vdGP) > 0.005 \quad (1a)$$

$$60 < vdGP \quad (2a).$$

In this regard, the Abbe number (vd) and the relative partial dispersion (θgF) can be defined with a refractive index of a material with respect to g-line light (Ng), a refractive index of the material with respect to d-line light (Nd), a refractive index of the material with respect to F-line light (NF), and a refractive index of the material with respect to C-line light (NC) as follows:

$$\nu d=(Nd-1)/(NF-NC)$$

$$\theta gF=(Ng-NF)/(NF-NC).$$

FIG. 7 illustrates a relationship between the Abbe number νd and the relative partial dispersion θ. Referring to FIG. 7, a point A indicates the relationship between the Abbe number νd and the relative partial dispersion θ when "PBM2" of OHARA INC. is used. In the example illustrated in FIG. 7, the Abbe number νd of PBM2 is 36.26 while the relative partial dispersion θgF is 0.5828.

A point B indicates the relationship between the Abbe number νd and the relative partial dispersion θ when "NSL7" of OHARA INC. is used. In the example illustrated in FIG. 7, the Abbe number νd of NSL7 is 60.49 while the relative partial dispersion θgF is 0.5436.

The straight line passing through the points A and B is used as a reference line. In this case, with respect to the dispersion of an optical glass material, the dispersion of a high-dispersion glass material whose Abbe number νd is as low as 35 or smaller lies above the reference line. On the other hand, the dispersion of a low-dispersion glass material whose Abbe number νd is in the range of about 35 to 60 usually may lie below the reference line.

The dispersion of an anomalous dispersion glass whose Abbe number νd is equal to or greater than 60 may lie above the reference line. It is useful, in correcting a secondary spectrum, to use a low-dispersion glass material whose dispersion lies above the reference line. More specifically, the greater the difference between the dispersion of a low-dispersion glass material and the reference material becomes, the more effectively various aberrations can be corrected.

The above-described condition (1a) expresses the anomalous dispersion of a lens material to be used with respect to d-line light and F-line light with the relative partial dispersion reference line as the reference thereof.

More specifically, the relative partial dispersion θgF in the condition (1a) denotes the anomalous dispersion of the lens material to be used with respect to g-line light and F-line light. The right-hand side of the condition (1a) expresses the difference between the relative partial dispersion of the material of the lens to be used with respect to g-line light and F-line light and that of a reference grass material of the lens to be used. Thus, the lens material satisfying the condition (1a) is generally called "anomalous dispersion glass".

If the relative partial dispersion θgF is greater than (lies above) the reference line, the refractive index with respect to g-line light is relatively greater than that of the reference glass. In order to reduce axial chromatic aberration to a small amount, an axial chromatic aberration coefficient of the entire optical system is to be set at a value of approximately "0".

An axial chromatic aberration coefficient L and a coefficient of chromatic aberration of magnification T can be expressed by the following expressions:

$$L=\Sigma(h^2 \cdot \phi/\nu d)$$

$$T=\Sigma(h \cdot hb \cdot \phi/\nu d)$$

where "φ" denotes the refractive index of the lens, "h" denotes the height of incidence of an axial ray, "hb" denotes the height of incidence of off-axis principal ray, and "νd" denotes the Abbe number.

Accordingly, a lens whose height of incidence h of an axial ray is large may most dominantly cause axial chromatic aberration. Furthermore, a lens whose height of incidence hb of an off-axis principal ray is large may most dominantly cause chromatic aberration of magnification.

FIG. 8 illustrates an exemplary arrangement of refractive powers of the optical system according to an exemplary embodiment of the present invention.

In the example illustrated in FIG. 8, the retrofocus optical system includes, in order from the object side to the image side, the first lens unit L1 having a positive or negative refractive power, the aperture stop SP, and the second lens unit having a positive refractive power.

Now, axial and off-axis principal rays in the optical system will be described in detail below. If a wide-angle lens corrects the axial chromatic aberrations of g-line light and C-line light so that the aberrations lie at the same position on the optical axis, then the positions of the aberrations deviate from an image forming position of d-line light towards an over-correction side. Furthermore, if a wide-angle lens corrects chromatic aberrations of magnification of g-line light and C-line light so that the aberrations lie at the same position on the image plane, then the positions of the aberrations deviate from d-line light towards outside the optical axis. In addition, in the example illustrated in FIG. 8, "La" denotes an axial ray used for determining the F-number.

The axial chromatic aberration of g-line light is corrected by the following principle.

If an anomalous dispersion glass is used in a positive lens of the first lens unit L1, then the force for bending g-line light towards the optical axis increases because the refractive power of g-line light of the anomalous dispersion glass is relatively higher than that of a normal glass material.

With respect to the height hb of the off-axis principal ray Lb in the first lens unit L1, the height hb is small at a position close to the aperture stop SP. Accordingly, the degree of influence from the chromatic aberration of magnification becomes small.

Therefore, the secondary spectrum of the axial chromatic aberration can be greatly improved without so much increasing the chromatic aberration of magnification by disposing a lens that can satisfy the condition (1a) at a position close to the aperture stop SP. Accordingly, if the lower limit of the condition (1a) is exceeded, it becomes difficult to correct axial chromatic aberration to a sufficiently small amount because the anomalous dispersion of the material of the lens used in the first lens unit L1 becomes small.

Furthermore, if the lower limit of the condition (2a) is exceeded, then the degree of achromatism in each lens unit becomes insufficient. In this case, if focusing on a short-distance object is executed by moving only the second lens unit L2 forward, chromatic aberration of magnification and axial chromatic aberration may greatly vary due to the focusing operation.

A back focal length when focusing on an infinitely-distant object in each exemplary embodiment (BF), a focal length of the entire optical system (f), an average refractive index of materials of positive lenses included in the second lens unit L2 (Np), and a distance between the surface of the positive lens of the first lens unit L1 on the image side and the aperture stop SP on the optical axis (Lp) can satisfy the following conditions:

$$1.0<BF/f<3.0 \qquad (3)$$

$$1.6<Np \qquad (4)$$

$$0.01<Lp/f<0.80 \qquad (5).$$

The condition (3) provides a condition for ensuring an appropriate value of a retrofocus ratio (Rf=BF/f) of the optical system.

In a retrofocus optical system, a cause and effect mutual relationship exists between the balance between a lens unit having a negative refractive power (the first lens unit) L1 and a lens unit having a positive refractive power (the second lens unit) L2 and the magnitude of the back focal length BF. In order to provide a long back focal length, the retrofocus ratio is to be increased. If the retrofocus ratio increases to a high level, the refractive power of the first lens unit having a negative refractive power may become extremely great.

In this case, the balance between the refractive power of the first lens unit having a negative refractive power and the refractive power of the second lens unit having a positive refractive power is gradually lost, resulting in degrading the optical performance of the optical system. In addition, the Petzval sum particularly degrades in this case. Accordingly, off-axis aberration, such as curvature of field or distortion, may increase. As a result, a large-size optical system may be used.

In order to prevent this, each exemplary embodiment can satisfy the condition (3). If the upper limit of the condition (3) is exceeded, then the retrofocus ratio may increase. In this case, the power of the first lens unit having a negative refractive power may increase. Accordingly, in this case, it becomes difficult to set an appropriate value of the Petzval sum in the optical system having the above-described lens configuration.

In addition, the off-axis aberration may increase. In this case, it becomes difficult to correct distortion, astigmatism, and curvature of field. Furthermore, the front lens effective diameter may increase. Accordingly, in this case, the size of the entire optical system may increase.

On the other hand, if the lower limit of the condition (3) is exceeded, the retrofocus ratio may become too small to secure an appropriate back focal length in a single-lens reflex camera.

The condition (4) provides a condition for calculating an average of refractive indexes of materials of positive lenses included in the second lens unit L2. If the lower limit of the condition (4) is exceeded, the value of the Petzval sum increases to a very great positive value. Accordingly, the amount of off-axis aberration, such as curvature of field, may increase. As a result, the entire size of the optical system may increase.

The condition (5) provides a condition for the distance between the surface of the positive lens GP of the first lens unit L1 on the image side to the aperture stop SP on the optical axis.

In a retrofocus optical system having a high F-number according to an exemplary embodiment of the present invention, a glass material having a high refractive index as the material of the positive lens of the second lens unit L2, which is disposed closer to the back side of the optical system than the aperture stop SP, as expressed by the condition (4) may be used.

However, if a glass material having a high refractive index is used as the material of the positive lens of the second lens unit L2, which is disposed closer to the back side of the optical system than the aperture stop SP, the amount of axial chromatic aberration and chromatic aberration of magnification may increase because the degree of dispersion of a glass material having a high refractive index is generally high (i.e., the Abbe number thereof is small).

In order to correct axial chromatic aberration, a glass material having a large Abbe number as the material of a lens of the first lens unit L1, which is disposed closer to the front side of the optical system than the aperture stop SP may be used. In addition, in order to reduce the difference between the axial chromatic aberrations of F-line light and g-line light and effectively correct the axial chromatic aberrations of c-line through g-line light, a glass material having a high relative partial dispersion may be used.

However, if a glass material having a large Abbe number and a high relative partial dispersion as the material of the positive lens of the first lens unit L1, which is disposed closer to the front side of the optical system than the aperture stop SP, then the amount of chromatic aberration of magnification may increase. In order to prevent this, it is useful if a positive lens having a large Abbe number and a high relative partial dispersion, which is provided with an appropriate refractive power, is disposed at a position at which the height of passage of a paraxial chief ray (the distance from the optical axis) hb becomes relatively low.

If the upper limit of the condition (5) is exceeded (if the distance between the positive lens GP and the aperture stop SP becomes too long), then a large amount of chromatic aberration of magnification may occur in a wide area. On the other hand, if the lower limit of the condition (5) is exceeded (if the distance between the surface of the positive lens GP on the image side and the aperture stop SP becomes too short), then the positive lens GP and the aperture stop SP may interfere with each other.

In order to further correct aberration and to decrease an amount of aberration variation during zooming in each exemplary embodiment, the range of the values in the conditions (3) through (5) can be altered as follows:

$$1.05 < BF/f < 2.50 \tag{3a}$$

$$1.63 < Np \tag{4a}$$

$$0.05 < Lp/f < 0.60 \tag{5a}$$

Each exemplary embodiment can implement an optical system capable of effectively correcting various aberrations, such as axial chromatic aberration, in particular, by satisfying the above-described conditions. It is further useful if the optical system according to each exemplary embodiment satisfies at least one of the following conditions (6) through (9), in which case the effect from each condition can be implemented.

The first lens unit L1 includes at least one negative lens GN that can satisfy the following conditions:

$$\theta gFGN - (0.6438 - 0.001682 \times vdGN) < 0 \tag{1b}$$

$$50 > vdGN \tag{2b}$$

where "vdGN" denotes the Abbe number of a material of the negative lens GN and "θgFGN" denotes the relative partial dispersion of the material. A technical significance of each of the conditions (1b) and (2b) is similar to that of the corresponding condition (1a) or (2a).

The distance on the optical axis between the surface of the negative lens GN on the image side and the aperture stop SP (Ln) can satisfy the following condition:

$$0.01 < Ln/f < 0.80 \tag{6}$$

The distance on the optical axis between the aperture stop SP and the last lens surface of the second lens unit L2 (LR) can satisfy the following condition:

$$0.5 < LR/f < 1.5 \tag{7}$$

The first lens unit L1 includes at least one negative lens GNF that can satisfy the following condition $$\theta gFGNF - (0.6438 - 0.001682 \times vdGNF) > 0 \tag{1c}$$

where "vdGNF" denotes the Abbe number of a material of the negative lens GNF and "θgFGNF" denotes the relative partial dispersion of the material. A technical significance of the condition (1c) is similar to that of the condition (1a).

The distance on the optical axis between the surface of the negative lens GNF on the image side and the aperture stop SP (LnF) can satisfy the following condition:

$$0.80 < LnF/f < 2.00 \tag{8}$$

The focal length of the second lens unit L2 (f2) can satisfy the following condition:

$$1.0 < f2/f < 2.0 \tag{9}$$

The condition (6) provides a condition for the distance on the optical axis from the back side (the surface on the image side) of the negative lens GN of the first lens unit L1 to the aperture stop SP. By satisfying the condition (6), axial chromatic aberration can be effectively corrected without increasing the amount of chromatic aberration of magnification that may occur in the optical system. Furthermore, by satisfying the condition (6), a high optical performance of the optical system can be achieved.

The condition (7) provides a condition for achieving a refractive power for the second lens unit L2 while reducing the effective diameter of the rear lens and effectively correcting the aberrations by setting an appropriate distance between the aperture stop SP and the last lens surface of the second lens unit L2.

If the upper limit of the condition (7) is exceeded, i.e., if the distance LR between the aperture stop SP and the last lens surface of the second lens unit L2 becomes very long, then the effective diameter of the rear lens may increase. Accordingly, it becomes difficult to mount the optical system on the camera.

On the other hand, if the lower limit of the condition (7) is exceeded, i.e., if the distance LR between the aperture stop SP and the last lens surface of the second lens unit L2 becomes very short, then a divergence surface, to correct spherical aberration and to achieve a refractive power necessary for the second lens unit L2, may not be provided.

The condition (8) provides a condition for the distance on the optical axis from the negative lens GNF of the first lens unit L1 to the aperture stop SP. As described above, by satisfying the conditions (5) and (6), axial chromatic aberration can be corrected but chromatic aberration of magnification may increase in this case.

The condition (8) is a condition for effectively correcting chromatic aberration of magnification. In the retrofocus optical system, in order to correct chromatic aberration of magnification by using the first lens unit L1, which is disposed closer to the object side than the aperture stop SP, it is useful if a negative lens having a large Abbe number and a high relative partial dispersion, which is provided with an appropriate refractive power, is disposed at a position at which the height of passage of a paraxial chief ray (the distance from the optical axis) hb becomes high. By satisfying the condition (8), chromatic aberration of magnification can be effectively corrected.

The condition (9) provides a condition for the focal length of the second lens unit L2. If the upper limit of the condition (9) is exceeded, then it becomes difficult to achieve an appropriately long back focal length while using an appropriate type of lens in the retrofocus optical system. On the other hand, if the lower limit of the condition (9) is exceeded, then it becomes difficult to correct negative distortion and negative spherical aberration.

In each exemplary embodiment, it is useful to satisfy at least one of the conditions (6) through (9). In each exemplary embodiment, the range of the values in the conditions (6) through (9) can further be set as follows:

$$0.1 < Ln/f < 0.6 \tag{6a}$$

$$0.6 < LR/f < 1.3 \tag{7a}$$

$$0.85 < LnF/f < 1.50 \tag{8a}$$

$$1.1 < f2/f < 1.8 \tag{9a}$$

With the above-described configuration, each exemplary embodiment can implement a retrofocus optical system capable of effectively correcting various aberrations, such as axial chromatic aberration or chromatic aberration of magnification, particularly, having a wide shooting angle of view ranging from 63° to 84°, and having a high F-number of 1.45.

In each exemplary embodiment, focusing from an infinitely-distant object to a short-distance object is executed by protruding (moving) the entire second lens unit L2 while the first lens unit L1 is kept stationary (fixed).

"GP" in each lens cross section indicates the positive lens of the first lens unit L1. The Abbe number vdGP and the relative partial dispersion θgFGP of the material of the positive lens GP can satisfy the conditions (1a) and (2a).

"GN" in each lens cross section indicates the negative lens of the first lens unit L1. The Abbe number vdGP and the relative partial dispersion θgFGP of the material of the negative lens GN can satisfy the conditions (1b) and (2b).

"GNF" in each lens cross section indicates the negative lens of the first lens unit L1. The Abbe number vdGNF and the relative partial dispersion θgFGNF of the material of the negative lens GNF can satisfy the condition (1c).

In the first exemplary embodiment illustrated in FIG. 1, the first lens unit L1 includes, in order from the object side to the image side, two negative lenses having a meniscus shape whose convex surface faces the object side, a positive lens both of whose surfaces have a convex shape, and a cemented lens composed of a negative lens GNF both of whose surfaces have a concave shape and a positive lens.

In the first exemplary embodiment, the first lens unit L1 has a positive refractive power. The first lens unit L1 further includes a positive lens both of whose surfaces have a convex shape and a cemented lens composed of a positive lens GP both of whose surfaces have a convex shape and a negative lens GN both of whose surfaces have a concave shape.

In the first exemplary embodiment, the second lens unit L2 includes, in order from the object side to the image side, a cemented lens composed of a negative lens whose concave surface faces the object side and a positive lens whose convex surface faces the image side, a positive lens both of whose surfaces have a convex shape, and a positive lens having a meniscus shape whose convex surface faces the image side.

The lens configuration of the optical system according the second exemplary embodiment (FIG. 3) is similar to that of the first exemplary embodiment (FIG. 1). In the second exemplary embodiment, the first lens unit L1 has a positive refractive power.

In the third exemplary embodiment (FIG. 5), the first lens unit L1 includes, in order from the object side to the image side, two negative lenses having a meniscus shape whose convex surface faces the object side, a positive lens both of whose surfaces have a convex shape, and a cemented lens composed of a negative lens GNF both of whose surfaces have a concave shape and a positive lens.

In the third exemplary embodiment, the first lens unit L1 has a positive refractive power. The first lens unit L1 further includes a cemented lens composed of a positive lens both of whose surfaces have a convex shape and a negative lens both of whose surfaces have a concave shape, a negative lens GN whose concave surface faces the object side, and a positive lens GP both of whose surfaces have a convex shape.

Furthermore, in the third exemplary embodiment, the second lens unit L2 includes, in order from the object side to the image side, a cemented lens composed of a positive lens having a meniscus shape whose concave surface faces the object side and a negative lens having a meniscus shape whose convex surface faces the image side, a positive lens both of whose surfaces have a convex shape, and a positive lens having a meniscus shape whose convex surface faces the image side.

In the above-described exemplary embodiments of the present invention, the first lens unit L1 has a positive refractive power. Alternatively, the first lens unit L1 can have a negative refractive power. In addition, it is also useful if the focal length of the first lens unit L1 is 1.5 times as long as the focal length of the second lens unit L2. It is further useful if the focal length of the first lens unit L1 is twice as long as the focal length of the second lens unit L2.

Now, an exemplary embodiment that can be achieved when the optical system described above in each of the first through the third exemplary embodiments is applied to an image pickup apparatus will be described in detail below with reference to FIG. 9.

FIG. 9 illustrates exemplary main components of a single-lens reflex camera.

Referring to FIG. 9, a photographic optical system 10 includes an optical system 1 according to the first through third exemplary embodiments. The photographic optical system 1 is mounted within a lens barrel 2, which is a supporting member.

A camera body 20 includes a quick return mirror 3, a focusing screen 4, a pentagonal roof prism 5, and an eyepiece lens 6. The quick-return mirror 3 reflects a light flux from the photographic optical system 10 in an upward direction. The focusing screen 4 is disposed at an image forming position of the photographic optical system 10.

The pentagonal roof prism 5 converts an inverse image formed on the focusing screen 4 into an erect image. An observer (operator of the camera) can observe the erect image via the eyepiece lens 6.

On a photosensitive surface 7, a solid-state image sensor (a photoelectric conversion element), such as a charge-coupled device (CCD) sensor or a complementary metal oxide semiconductor (CMOS) sensor, or a silver-halide film, which is configured to optically receive an image, is disposed.

During shooting, the quick return mirror 3 retracts from the optical path. Then, an image is formed by the photographic optical system 10 on the photosensitive surface 7.

The optical system according to each exemplary embodiment of the present invention can be applied not only to a digital camera, a video camera, or a silver-halide film camera but also to an optical apparatus, such as a telescope, binoculars, a copying machine, or a projector.

Numerical examples 1 through 3 that respectively correspond to the first through the third exemplary embodiments are set forth below. In each of the numerical examples 1 through 3, "i" denotes the order of a surface from the object side, "ri" denotes a radius of curvature of the i-th optical surface (an i-th surface), "di" denotes an axial interval between the i-th surface and the (i+1)th surface, "ndi" and "vdi" respectively denote a refractive index and an Abbe number of the i-th optical material with respect to d-line light. In addition, "BF" denotes the back focal length and "*" indicates that the corresponding surface is aspheric. Aspheric coefficients are expressed by the following expression, which is an expression for the aspheric shape:

$$x = \frac{\frac{h^2}{R}}{1+\sqrt{1-\left(\frac{h}{R}\right)^2}} + C_4 h^4 + C_6 h^6 + C_8 h^8 + C_{10} h^{10}$$

where "x" denotes a displacement from a surface vertex along the optical axis in a position at a height "h" from the optical axis, "R" denotes a paraxial radius of curvature, and "C f" denotes an n-th order aspheric coefficient.

In addition, "E-Z" denotes "×10$^{-Z}$". Values of the Abbe number vd and the relative partial dispersion θgF of the positive lens GP, the negative lens GN, and the negative lens GNF are set forth in Table 1. The relationship between each condition described above and values in each numerical example is set forth in Table 2.

Numerical Example 1

| | Surface No. | ri | di | ndi | vdi | Effective diameter |
|---|---|---|---|---|---|---|
| | | | Surface data | | | |
| L1 | 1 | 131.721 | 2.70 | 1.51742 | 52.4 | 51.15 |
| | 2 | 26.789 | 8.10 | | | 41.76 |
| | 3 | 84.345 | 3.30 | 1.48749 | 70.2 | 41.55 |
| | 4* | 26.762 | 3.94 | | | 38.86 |
| | 5 | 49.974 | 6.16 | 1.88300 | 40.8 | 38.88 |
| | 6 | −249.304 | 4.23 | | | 38.32 |
| | 7 | −45.194 | 2.10 | 1.61293 | 37.0 | 37.47 |
| | 8 | 51.936 | 6.44 | 1.83481 | 42.7 | 36.27 |
| | 9 | −104.883 | 5.03 | | | 35.95 |
| | 10 | 44.614 | 5.67 | 1.83481 | 42.7 | 34.71 |
| | 11 | −147.133 | 0.09 | | | 34.35 |
| | 12 | 80.063 | 5.84 | 1.49700 | 81.5 | 32.02 |
| | 13 | −48.382 | 1.70 | 1.65412 | 39.7 | 30.83 |
| | 14 | 30.631 | 7.90 | | | 26.86 |
| stop | 15 | ∞ | 6.44 | | | 25.52 |
| L2 | 16 | −20.281 | 1.40 | 1.80000 | 29.9 | 24.92 |
| | 17 | 207.522 | 4.59 | 1.80400 | 46.6 | 28.09 |
| | 18 | −56.354 | 0.25 | | | 29.21 |
| | 19 | 79.507 | 7.92 | 1.59240 | 68.3 | 31.04 |
| | 20 | −32.694 | 0.25 | | | 32.38 |
| | 21* | −119.896 | 4.93 | 1.77250 | 49.6 | 33.41 |
| | 22 | −39.518 | 37.98 | | | 34.91 |

| | Aspheric Coefficients | | | |
|---|---|---|---|---|
| | c4 | c6 | c8 | c10 |
| r4 | −8.24273E−06 | −8.75030E−09 | −2.15137E−12 | −1.21085E−14 |
| r21 | −9.26947E−06 | −3.03922E−09 | −1.77751E−13 | −1.10418E−14 |

| Various Data | |
|---|---|
| Focal Length | 34.59 |
| F-number | 1.45 |
| Angle of View | 32.02 |
| Image Height | 21.64 |
| Lens Total Length | 126.93 |
| BF | 37.98 |

-continued

Focal Length of Each Lens Unit

| | |
|---|---|
| L1 | 102.5 |
| L2 | 43.5 |

Numerical Example 2

Surface data

| | Surface No. | ri | di | ndi | vdi | Effective diameter |
|---|---|---|---|---|---|---|
| L1 | 1 | 126.933 | 2.70 | 1.51742 | 52.4 | 50.86 |
| | 2 | 26.727 | 8.15 | | | 41.59 |
| | 3 | 87.278 | 3.30 | 1.48749 | 70.2 | 41.37 |
| | 4* | 27.694 | 3.81 | | | 38.76 |
| | 5 | 52.883 | 5.94 | 1.88300 | 40.8 | 38.75 |
| | 6 | −192.056 | 3.55 | | | 38.28 |
| | 7 | −45.007 | 2.10 | 1.60342 | 38.0 | 37.98 |
| | 8 | 49.133 | 6.48 | 1.83481 | 42.7 | 36.65 |
| | 9 | −111.47 | 4.72 | | | 36.34 |
| | 10 | 46.511 | 5.35 | 1.83481 | 42.7 | 34.36 |
| | 11 | −151.76 | 0.09 | | | 34.02 |
| | 12 | 106.328 | 5.82 | 1.56907 | 71.3 | 32.17 |
| | 13 | −43.299 | 1.70 | 1.65412 | 39.7 | 31.12 |
| | 14 | 31.509 | 8.47 | | | 27.05 |
| stop | 15 | ∞ | 6.59 | | | 25.56 |
| L2 | 16 | −19.704 | 1.40 | 1.80000 | 29.9 | 24.97 |
| | 17 | 2353.87 | 4.60 | 1.77250 | 49.6 | 28.2 |
| | 18 | −49.934 | 0.25 | | | 29.49 |
| | 19 | 85.705 | 7.85 | 1.59240 | 68.3 | 31.49 |
| | 20 | −32.265 | 0.25 | | | 32.36 |
| | 21* | −101.111 | 4.97 | 1.75500 | 52.3 | 33.33 |
| | 22 | −37.105 | 38.47 | | | 34.89 |

Aspheric Coefficients

| | c4 | c6 | c8 | c10 |
|---|---|---|---|---|
| r4 | −7.6914E−06 | −7.6187E−09 | −3.5704E−12 | −6.7948E−15 |
| r21 | −9.5317E−06 | −2.9975E−09 | −2.4628E−13 | −1.1618E−14 |

Various Data

| | |
|---|---|
| Focal Length | 34.81 |
| F-number | 1.45 |
| Angle of View | 31.86 |
| Image Height | 21.64 |
| Lens Total Length | 126.57 |
| BF | 38.47 |

Focal Length of Each Lens Unit

| | |
|---|---|
| L1 | 103.5 |
| L2 | 43.5 |

Numerical Example 3

Surface data

| | Surface No. | ri | di | ndi | vdi | Effective diameter |
|---|---|---|---|---|---|---|
| L1 | 1 | 64.588 | 2.90 | 1.83481 | 42.7 | 54.54 |
| | 2 | 27.134 | 8.59 | | | 43.79 |
| | 3 | 78.633 | 3.35 | 1.58373 | 59.0 | 43.49 |
| | 4* | 26.588 | 6.91 | | | 39.29 |
| | 5 | 104.899 | 5.15 | 1.883 | 40.8 | 39.12 |
| | 6 | −104.899 | 0.89 | | | 38.77 |
| | 7 | −72.964 | 2.10 | 1.497 | 81.5 | 38.69 |
| | 8 | 46.394 | 5.95 | 1.83481 | 42.7 | 35.93 |
| | 9 | −224.128 | 3.78 | | | 35.24 |
| | 10 | 37.165 | 6.85 | 1.834 | 37.2 | 27.97 |
| | 11 | −46.716 | 1.50 | 1.60342 | 38.0 | 26.11 |
| | 12 | 19.654 | 5.07 | | | 23.04 |
| | 13 | −76.688 | 1.30 | 1.65412 | 39.7 | 23.11 |
| | 14 | 76.688 | 0.20 | | | 23.76 |
| | 15 | 26.781 | 6.55 | 1.497 | 81.5 | 25.16 |
| | 16 | −64.437 | 3.40 | | | 25.15 |
| stop | 17 | ∞ | 6.64 | | | 24.16 |
| L2 | 18 | −18.579 | 3.55 | 1.48749 | 70.2 | 23.65 |
| | 19 | −15.481 | 1.60 | 1.84666 | 23.8 | 24.36 |
| | 20 | −42.869 | 0.20 | | | 28.1 |
| | 21 | 103.587 | 8.20 | 1.618 | 63.4 | 30.9 |
| | 22 | −28.2 | 0.20 | | | 31.6 |
| | 23* | −116.641 | 6.00 | 1.851 | 40.4 | 32.83 |
| | 24 | −33.79 | 38.48 | | | 34.92 |

Aspheric Coefficients

| | c4 | c6 | c8 | c10 |
|---|---|---|---|---|
| r4 | −5.6034E−06 | −8.8149E−09 | 3.9223E−12 | −2.2756E−14 |
| r23 | −1.1961E−05 | −2.8659E−09 | −7.0647E−12 | −1.3455E−14 |

Various Data

| | |
|---|---|
| Focal Length | 24.54 |
| F-number | 1.45 |
| Angle of View | 41.4 |
| Image Height | 21.64 |
| Lens Total Length | 129.35 |
| BF | 38.48 |

Focal Length of Each Lens Unit

| | |
|---|---|
| L1 | 116.7 |
| L2 | 37.4 |

TABLE 1

| | | Numerical Example | | |
|---|---|---|---|---|
| | | 1 | 2 | 3 |
| Positive Lens GP | vd | 81.5 | 71.3 | 81.5 |
| | θGF | 0.54 | 0.55 | 0.54 |
| Negative Lens GN | vd | 39.7 | 39.7 | 39.7 |
| | θGF | 0.57 | 0.57 | 0.57 |
| Negative Lens GNF | vd | 37.0 | 38.0 | 81.5 |
| | θGF | 0.59 | 0.58 | 0.54 |

TABLE 2

| Conditional Expression | Numerical Example | | |
|---|---|---|---|
| | 1 | 2 | 3 |
| (3) | 1.10 | 1.11 | 1.57 |
| (4) | 1.72 | 1.71 | 1.65 |
| (5) | 0.28 | 0.29 | 0.14 |
| (6) | 0.23 | 0.24 | 0.41 |
| (7) | 0.75 | 0.74 | 1.08 |
| (8) | 0.94 | 0.94 | 1.41 |
| (9) | 1.26 | 1.25 | 1.52 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-204028 filed Aug. 7, 2008, which is hereby incorporated by reference herein in its entirety.

What is claimed is:

1. An optical system comprising, in order from an object side to an image side:
    a first lens unit;
    an aperture stop; and
    a second lens unit having a positive refractive power,
    wherein the first lens unit includes at least one positive lens made of a material whose Abbe number (vdGP) and relative partial dispersion (θgFGP) satisfy the following conditions:

$\theta gFGP - (0.6438 - 0.001682 \times vdGP) > 0.005$ $60 < vdGP$, and wherein a back focal length when focusing on an infinitely-distant object point (BF), a focal length of the entire optical system (f), an average refractive index of materials of positive lenses included in the second lens unit (Np), and a distance from a surface of the positive lens of the first lens unit on the image side to the aperture stop on an optical axis (Lp) satisfy following conditions:

$1.0 < BF/f < 3.0$ $1.6 < Np$ $0.01 < Lp/f < 0.80$.

2. The optical system according to claim 1, wherein the first lens unit includes at least one negative lens made of a material whose Abbe number (vdGN) and relative partial dispersion (θgFGN) satisfy following conditions:

$\theta gFGN - (0.6438 - 0.001682 \times vdGN) < 0$ $50 > vdGN$, and wherein a distance from a surface of the negative lens on the image side to the aperture stop on the optical axis (Ln) satisfies the following condition:

$0.01 < Ln/f < 0.80$.

3. The optical system according to claim 2, wherein a distance from the aperture stop to a last lens surface of the second lens unit on the optical axis (LR) satisfies the following condition:

$0.5 < LR/f < 1.5$.

4. The optical system according to claim 1, wherein the first lens unit includes at least one negative lens made of a material whose Abbe number (vdGNF) and relative partial dispersion (θgFGNF) satisfy the following condition:

$\theta gFGNF - (0.6438 - 0.001682 \times vdGNF) > 0$, and wherein a distance from a surface of the at least one negative lens on the image side to the aperture stop on the optical axis (LnF) satisfies the following condition:

$0.80 < LnF/f < 2.00$.

5. The optical system according to claim 1, wherein a focal length of the second lens unit (f2) satisfies the following condition:

$1.0 < f2/f < 1.5$.

6. The optical system according to claim 1, wherein the optical system is configured to form an image on a photoelectric conversion element.

7. An image pickup apparatus comprising:
    the optical system according to claim 1; and
    a photoelectric conversion element configured to receive an image formed by the optical system.

8. An optical system comprising, in order from an object side to an image side:
    a first lens unit;
    an aperture stop; and
    a second lens unit having a positive refractive power,
    wherein the first lens unit includes at least one positive lens made of a material whose Abbe number (vdGP) and relative partial dispersion (θgFGP) satisfy the following conditions:

$\theta gFGP - (0.6438 - 0.001682 \times vdGP) > 0.005$ $60 < vdGP$.

* * * * *